US007792672B2

(12) United States Patent
Rosec et al.

(10) Patent No.: US 7,792,672 B2
(45) Date of Patent: Sep. 7, 2010

(54) METHOD AND SYSTEM FOR THE QUICK CONVERSION OF A VOICE SIGNAL

(75) Inventors: Olivier Rosec, Lannion (FR); Taoufik En-Najjary, Valbonne (FR)

(73) Assignee: France Telecom, Paris (FR)

( * ) Notice: Subject to any disclaimer, the term of this patent is extended or adjusted under 35 U.S.C. 154(b) by 1006 days.

(21) Appl. No.: 10/591,599

(22) PCT Filed: Mar. 14, 2005

(86) PCT No.: PCT/FR2005/000607

§ 371 (c)(1),
(2), (4) Date: Sep. 5, 2006

(87) PCT Pub. No.: WO2005/106853

PCT Pub. Date: Nov. 10, 2005

(65) Prior Publication Data

US 2007/0192100 A1 Aug. 16, 2007

(30) Foreign Application Priority Data

Mar. 31, 2004 (FR) .................................. 04 03405

(51) Int. Cl.
*G10L 17/00* (2006.01)

(52) U.S. Cl. ....................... 704/246; 704/277; 704/208; 704/256; 704/270

(58) Field of Classification Search ................. 704/246, 704/208, 231, 251, 270–278, 256
See application file for complete search history.

(56) References Cited

U.S. PATENT DOCUMENTS 5,327,521 A * 7/1994 Savic et al. ................. 704/272
5,572,624 A * 11/1996 Sejnoha ................... 704/256.2
6,029,124 A * 2/2000 Gillick et al. ............... 704/200
6,336,092 B1 * 1/2002 Gibson et al. ............... 704/268
6,405,166 B1 * 6/2002 Huang et al. ................ 704/246

(Continued)

FOREIGN PATENT DOCUMENTS

WO 02/067245 8/2002

OTHER PUBLICATIONS

Stylianou Y et al: “Statistical methods for voice quality transformation” 4th European Conference on Speech Communication and Technology Eurospeech 95. Madrid, Spain, Sep. 18-21, 1995, European Conference on Speech Communication and Technology. (Eurospeech), Madrid: Graficas Brens, ES, vol. vol. 1 Conf. 4, Sep. 18, 1995, pp. 447-450, XP000854745.

(Continued)

*Primary Examiner*—Vijay B Chawan
(74) *Attorney, Agent, or Firm*—Young & Thompson

(57) ABSTRACT

A method for converting a voice signal from a source speaker into a converted voice signal with acoustic characteristics similar to those of a target speaker includes the steps of determining (1) at least one function for transforming source speaker acoustic characteristics into acoustic characteristics similar to those of the target speaker using target and source speaker voice samples; and transforming acoustic characteristics of the source speaker voice signal to be converted by applying the transformation function(s). The method is characterized in that the transformation (2) includes the step (44) of applying only a predetermined portion of at least one transformation function to said signal to be converted.

17 Claims, 3 Drawing Sheets

U.S. PATENT DOCUMENTS

| | | | | |
|---|---|---|---|---|
| 6,615,174 | B1 * | 9/2003 | Arslan et al. | 704/270 |
| 6,879,952 | B2 * | 4/2005 | Acero et al. | 704/222 |
| 2001/0037195 | A1 * | 11/2001 | Acero et al. | 704/200 |
| 2005/0137862 | A1 * | 6/2005 | Monkowski | 704/222 |

OTHER PUBLICATIONS

Bandoin G et al: “On the transformation of the speech spectrum for voice conversion” spoken language, 1996. ICSLP 96, Proceedings, Fourth International Conference on Philadelphia, PA USA Oct. 3-6, 1996, New York, NY USA IEEE, US, Oct. 3, 1996, pp. 1405-1408.

Helenca Duxans and Antonio Bonafonte et al: “Estimation of GMM in voice conversion including unaligned data” Proceedings of the eurospeech 2003 conference, Sep. 2003, pp. 861-864.

Yining Cheni et al: “Voice Conversion with Smoothed GMM and MAP Adapatation” proceeding of the eurospeech 2003 conference, Sep. 2003, pp. 2413-2416.

Laroche et al: HNM: a simple, efficient harmonic+noise model to audio and acoustics, 1993. Final program and paper summaries., 1993 IEEE workshop on New Paltz, NY, USA Oct. 17-20, 1993, New York, NY USA IEEE, Oct. 17, 1993, pp. 169-172.

* cited by examiner

METHOD AND SYSTEM FOR THE QUICK CONVERSION OF A VOICE SIGNAL

FIELD OF THE INVENTION

The present invention relates to a method for converting a voice signal delivered by a source speaker into a converted voice signal having acoustic features resembling those of a target speaker, and a system implementing such a method.

BACKGROUND OF THE INVENTION

In the context of voice conversion applications, such as voice services, man-machine oral dialog applications or the voice synthesis of texts, the auditory reproduction is essential and, to achieve acceptable quality, it is necessary to have a firm control over the parameters related to the prosody of the voice signals.

Conventionally, the main acoustic or prosodic parameters modified during voice conversion methods are the parameters relating to the spectral envelope and/or, for voiced sounds putting into action the vibration of the vocal cords, the parameters relating to a periodic structure, i.e. the fundamental period, the inverse of which is called the fundamental frequency or pitch.

Conventional voice conversion methods comprise in general the determination of at least one function for transforming acoustic features of the source speaker into acoustic features similar to those of the target speaker, and the transformation of a voice signal to be converted by the application of this or these functions.

This transformation is an operation that is long and costly in terms of computation time.

Indeed, such transformation functions are conventionally considered as linear combinations of a large finite number of transformation elements applied to elements representing the voice signal to be converted.

SUMMARY OF THE INVENTION

The object of the invention is to solve these problems by defining a method and a system, that are fast and of good quality, for converting a voice signal.

To this end, a subject of the present invention is a method for converting a voice signal delivered by a source speaker into a converted voice signal having acoustic features resembling those of a target speaker, comprising:

- the determination of at least one function for transforming acoustic features of the source speaker into acoustic features similar to those of the target speaker, using voice samples from the source and target speakers; and
- the transformation of acoustic features of the source speaker voice signal to be converted by applying the at least one transformation function, characterized in that the transformation comprises a step for applying only a determined part of at least one transformation function to the signal to be converted.

The method of the invention thus provides for reducing the computation time necessary for the implementation, by virtue of the application only of a determined part of at least one transformation function.

According to other features of the invention:

- the determination of at least one transformation function comprises a step for determining a model representing in a weighted manner common acoustic features of voice samples from the target speaker and from the source speaker on a finite set of model components, and the transformation comprises:
  - a step for analyzing the voice signal to be converted, which voice signal being grouped into frames, in order to obtain, for each frame of samples, information relating to the acoustic features;
  - a step for determining an index of correspondence between the frames to be converted and each component of the model; and
  - a step for selecting a determined part of the components of the model according to the correspondence indices, the step for applying only a determined part of at least one transformation function comprising the application to the frames to be converted of the sole part of the at least one transformation function corresponding to the selected components of the model;
- it additionally comprises a step for normalizing each of the correspondence indices of the selected components with respect to the sum of all the correspondence indices of the selected components;
- it additionally comprises a step for storing the correspondence indices and the determined part of the model components, performed before the transformation step, which is delayed in time;
- the determination of the at least one transformation function comprises:
  - a step for analyzing voice samples from the source and target speakers, grouped into frames in order to obtain acoustic features for each frame of samples from a speaker;
  - a step for the time alignment of the acoustic features of the source speaker with the acoustic features of the target speaker, this step being performed before the step for determining a model;
- the step for determining a model corresponds to the determination of a Gaussian probability density mixture model;
- the step for determining a model comprises:
  - a sub-step for determining a model corresponding to a Gaussian probability density mixture, and
  - a sub-step for estimating parameters of the Gaussian probability density mixture from the estimation of the maximum likelihood between the acoustic features of the samples from the source and target speakers and the model;
- the determination of at least one transformation function is performed based on an estimator of the realization of the acoustic features of the target speaker given the acoustic features of the source speaker;
- the estimator is formed by the conditional expectation of the realization of the acoustic features of the target speaker given the realization of the acoustic features of the source speaker;
- it additionally includes a synthesis step for forming a converted voice signal from the transformed acoustic information.

Another subject of the invention is a system for converting a voice signal delivered by a source speaker into a converted voice signal having acoustic features resembling those of a target speaker, comprising:

- means for determining at least one function for transforming acoustic features of the source speaker into acoustic features similar to those of the target speaker, using voice samples from the source and target speakers; and means for transforming acoustic features of the source speaker voice signal to be converted by applying the at least one transformation function, characterized in that the transformation means are adapted for the application only of a determined part of at least one transformation function to the signal to be converted.

According to other features of the system:

the determination means are adapted for the determination of at least one transformation function using a model representing in a weighted manner common acoustic features of voice samples from the source and target speakers on a finite set of components, and the system includes:

means for analyzing the signal to be converted, which signal being grouped into frames, in order to obtain, for each frame of samples, information relating to the acoustic features;

means for determining an index of correspondence between the frames to be converted and each component of the model; and means for selecting a determined part of the components of the model according to the correspondence indices, the application means being adapted to apply only a determined part of the at least one transformation function corresponding to the selected components of the model.

BRIEF DESCRIPTION OF THE DRAWINGS

The invention will be better understood on reading the following description given purely by way of example and with reference to the appended drawings in which.

DETAILED DESCRIPTION OF EMBODIMENTS

Voice conversion consists in modifying the voice signal of a reference speaker called the source speaker such that the signal produced appears to have been delivered by another speaker, called the target speaker.

Such a method includes first the determination of functions for transforming acoustic or prosodic features of voice signals from the source speaker into acoustic features similar to those of voice signals from the target speaker, using voice samples delivered by the source speaker and the target speaker.

More specifically, the determination 1 of transformation functions is carried out on databases of voice samples corresponding to the acoustic realization of the same phonetic sequences delivered respectively by the source and target speakers.

Figure 1A:
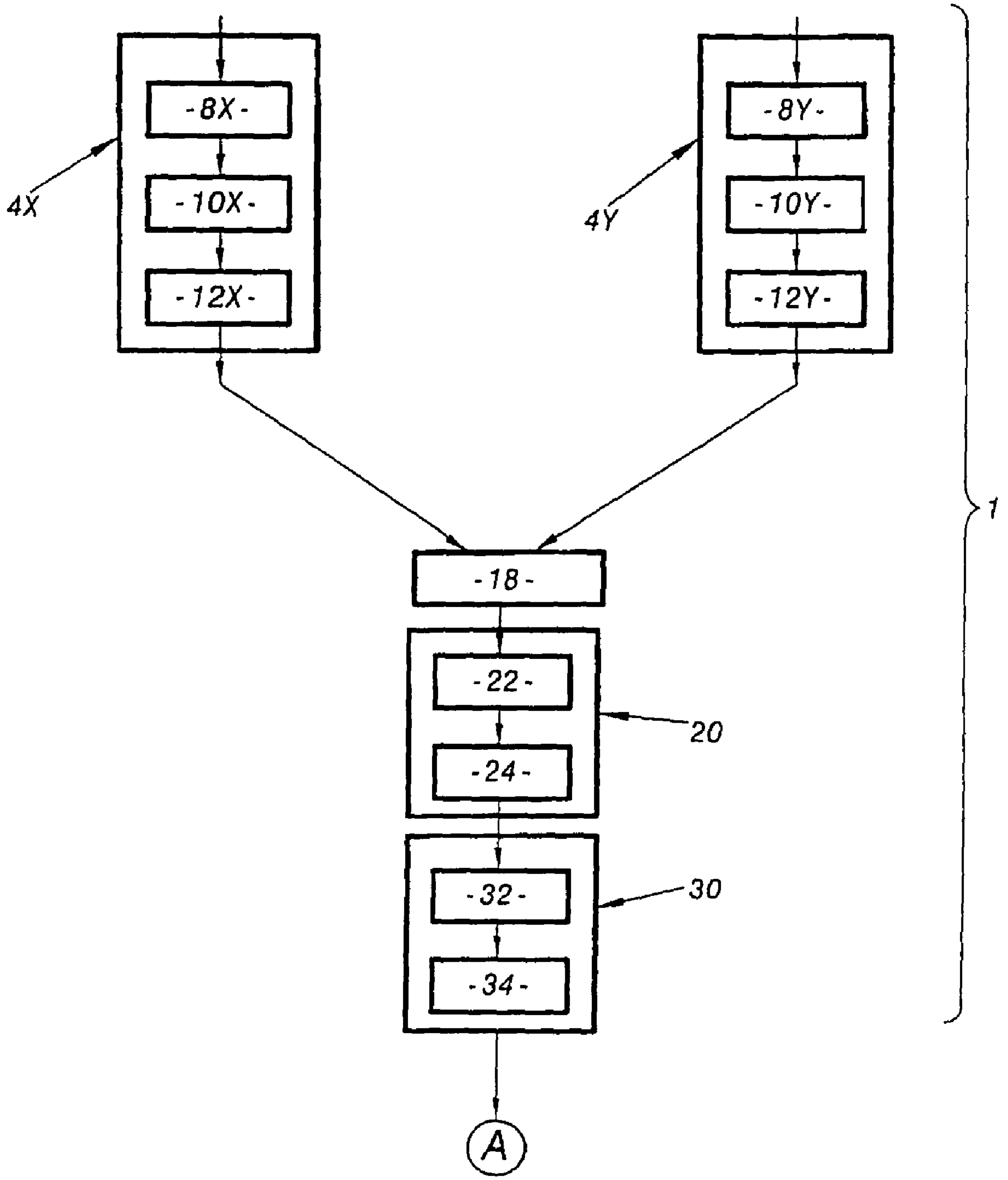
FIGS. 1A and 1B represent a general flow chart of the method of the invention.

This determination process is denoted in FIG. 1A by the general numerical reference 1 and is also commonly referred to as "training".

The method then includes a transformation of the acoustic features of a voice signal to be converted delivered by the source speaker, using the function or functions determined previously. This transformation is denoted by the general numerical reference 2 in FIG. 1B.

Depending from the embodiments, various acoustic features are transformed such as spectral envelope and/or fundamental frequency features.

The method begins with steps 4X and 4Y for analyzing voice samples delivered respectively by the source and target speakers. These steps are for grouping the samples together by frames, in order to obtain, for each frame of samples, information relating to the spectral envelope and/or information relating to the fundamental frequency.

In the embodiment described, the analysis steps 4X and 4Y are based on the use of a sound signal model in the form of a sum of a harmonic signal with a noise signal according to a model commonly referred to as HNM (Harmonic plus Noise Model).

The HNM model comprises the modeling of each voice signal frame as a harmonic part representing the periodic component of the signal, made up of a sum of L harmonic sinusoids of amplitude $A_l$ and phase $\phi_l$, and as a noise part representing the friction noise and the variation in glottal excitation.

Hence, one can express:

$$s(n) = h(n) + b(n)$$

$$\text{where } h(n) = \sum_{l=1}^{L} A_l(n)\cos(\phi_l(n))$$

The term h(n) therefore represents the harmonic approximation of the signal s(n).

Furthermore, the embodiment described is based on a representation of the spectral envelope by the discrete cepstrum.

Steps 4X and 4Y include sub-steps 8X and 8Y for estimating, for each frame, the fundamental frequency, for example by means of an autocorrelation method.

Sub-steps 8X and 8Y are each followed by a sub-step 10X and 10Y for the synchronized analysis of each frame on its fundamental frequency, enabling the parameters of the harmonic part as well as the parameters of the noise of the signal and in particular the maximum voicing frequency to be estimated. As a variant, this frequency can be fixed arbitrarily or be estimated by other known means.

In the embodiment described, this synchronized analysis corresponds to the determination of the parameters of the harmonics by minimization of a weighted least squares criterion between the complete signal and its harmonic decomposition corresponding, in the embodiment described, to the estimated noise signal. The criterion denoted by E is equal to:

$$E = \sum_{n=-T_i}^{T_i} w^2(n)(s(n) - h(n))^2$$

In this equation, w(n) is the analysis window and $T_i$ is the fundamental period of the current frame.

Thus, the analysis window is centered around the mark of the fundamental period and has a duration of twice this period.

As a variant, these analyses are performed asynchronously with a fixed analysis step and a window of fixed size.

The analysis steps 4X and 4Y lastly include sub-steps 12X and 12Y for estimating parameters of the spectral envelope of signals using, for example, a regularized discrete cepstrum method and a Bark scale transformation to reproduce as faithfully as possible the properties of the human ear.

Thus, the analysis steps 4X and 4Y deliver respectively for the voice samples delivered by the source and target speakers, for each frame numbered n of samples of speech signals, a scalar denoted by $F_n$ representing the fundamental frequency and a vector denoted by $c_n$ comprising spectral envelope information in the form of a sequence of cepstral coefficients.

The manner in which the cepstral coefficients are calculated corresponds to an operational technique that is known in the prior art and, for this reason, will not be described further in detail.

The method of the invention therefore provides for defining, for each frame n of the source speaker, a vector denoted by $x_n$ of cepstral coefficients $c_x(n)$ and the fundamental frequency.

Similarly, the method provides for defining, for each frame n of the target speaker, a vector $y_n$ of cepstral coefficients $c_y(n)$, and the fundamental frequency.

Steps 4X and 4Y are followed by a step 18 for alignment between the source vector $x_n$ and the target vector $y_n$, so as to form a match between these vectors which match is obtained by a conventional dynamic time alignment algorithm called DTW (Dynamic Time Warping).

The alignment step 18 is followed by a step 20 for determining a model representing in a weighted manner the common acoustic features of the source speaker and of the target speaker on a finite set of model components.

In the embodiment described, the model is a probabilistic model of the acoustic features of the target speaker and of the source speaker, according to a model denoted by GMM of mixtures of components formed of Gaussian densities. The parameters of the components are estimated from source and target vectors containing, for each speaker, the discrete cepstrum.

Conventionally, the probability density of a random variable denoted generally by p(z), according to a Gaussian probability density mixture model GMM is expressed mathematically as follows:

$$p(z) = \sum_{i=1}^{Q} \alpha_i x N(z, \mu_i; \Sigma_i)$$

$$\text{where } \sum_{i=1}^{Q} \alpha_i = 1, \; 0 \le \alpha_i \le 1$$

In this formula, Q denotes the number of components in the model, $N(z; \mu_i, \Sigma_i)$ is the probability density of the normal distribution of mean $\mu_i$ and of covariance matrix $\Sigma_i$ and the coefficients $\alpha_i$ are the coefficients of the mixture.

Thus, the coefficient $\alpha_i$ corresponds to the probability a priori that the random variable z is generated by the $i^{th}$ Gaussian component of the mixture.

More specifically, step 20 for determining the model includes a sub-step 22 for modeling the joint density p(z) of the source vector denoted by x and the target vector denoted by y, such that:

$$Z_n = \begin{bmatrix} T & T \\ x_n, & y_n \end{bmatrix}^T$$

Step 20 then includes a sub-step 24 for estimating GMM parameters $(\alpha, \mu, \Sigma)$ of the density p(z). This estimation can be achieved, for example, using a conventional algorithm of the EM (Expectation-Maximization) type, corresponding to an iterative method leading to the obtaining of an estimator of maximum likelihood between the data of the speech samples and the Gaussian mixture model.

The initial parameters of the GMM model are determined using a conventional vector quantization technique.

The model determination step 20 thus delivers the parameters of a mixture of Gaussian densities, which parameters are representative of common acoustic features of the source speaker and target speaker voice samples.

The model thus defined therefore forms a weighted representation of common spectral envelope acoustic features of the target speaker and source speaker voice samples on the finite set of components of the model.

The method then includes a step 30 for determining, from the model and voice samples, a function for transforming the spectral envelope of the signal of the source speaker to the target speaker.

This transformation function is determined from an estimator for the realization of the acoustic features of the target speaker given the acoustic features of the source speaker, formed, in the embodiment described, by the conditional expectation.

For this purpose, step 30 includes a sub-step 32 for determining the conditional expectation of the acoustic features of the target speaker given the acoustic feature information of the source speaker. The conditional expectation is denoted by F(x) and is determined using the following formulae:

$$F(x) = E[y \mid x] = \sum_{i=1}^{Q} h_i(x)[\mu_i^y + \Sigma_i^{yx}(\Sigma_i^{xx})^{-1}(x - \mu_i^x)]$$

$$\text{where } h_i(x) = \frac{\alpha_i N(x, \mu_i^x, \Sigma_i^{xx})}{\sum_{j=1}^{Q} \alpha_j N(x, \mu_j^x, \Sigma_j^{xx})}$$

$$\text{where } \Sigma_i = \begin{bmatrix} \Sigma_i^{xx} & \Sigma_i^{xy} \\ \Sigma_i^{yx} & \Sigma_i^{yy} \end{bmatrix} \text{ and } \mu_i = \begin{bmatrix} \mu_i^x \\ \mu_i^y \end{bmatrix}$$

In these equations, $h_i(x)$ corresponds to the probability a posteriori that the source vector x is generated by the $i^{th}$ component of the Gaussian density mixture model of the model, and the term in square brackets corresponds to a transformation element determined from the model. It is recalled that y denotes the target vector.

By determining the conditional expectation it is thus possible to obtain the function for transforming spectral envelope features between the source speaker and the target speaker in the form of a weighted linear combination of transformation elements.

Step 30 also includes a sub-step 34 for determining a function for transforming the fundamental frequency, by a scaling of the fundamental frequency of the source speaker, onto the fundamental frequency of the target speaker. This step 34 is achieved conventionally at any instant in the method after sub-steps 8X and 8Y for estimating the fundamental frequency.

Figure 1B:
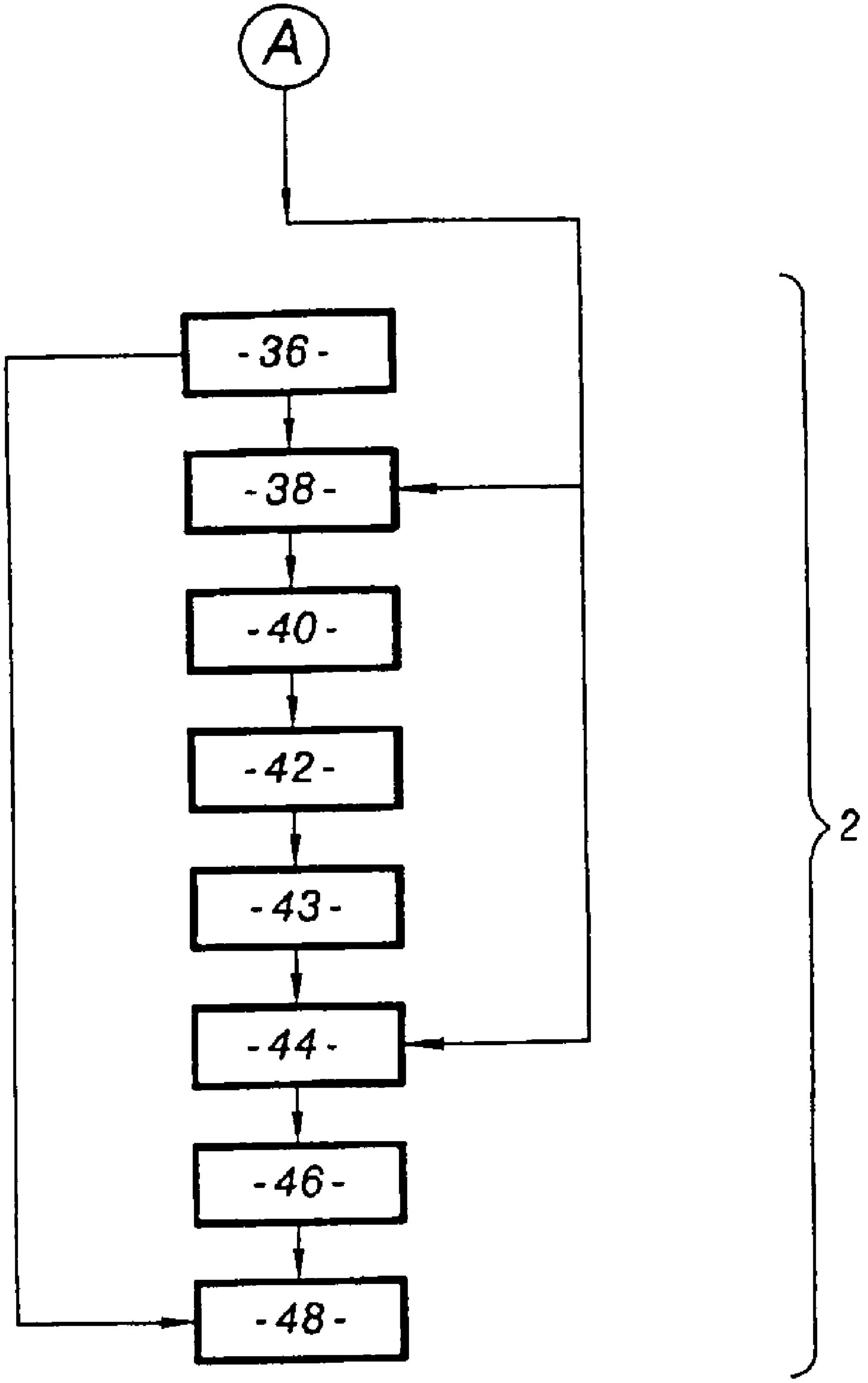

With reference to FIG. 1B, the conversion method then includes the transformation 2 of a voice signal to be converted delivered by the source speaker, which signal to be converted can be different from the voice signals used previously.

This transformation 2 begins with an analysis step 36 performed, in the embodiment described, using a decomposition according to the HNM model similar to those performed in steps 4X and 4Y described previously. This step 36 is for delivering spectral envelope information in the form of cepstral coefficients, fundamental frequency information as well as maximum voicing frequency and phase information.

This analysis step 36 is followed by a step 38 for determining an index of correspondence between the vector to be converted and each component of the model.

In the embodiment described, each of these indices corresponds to the probability a posteriori of the realization of the vector to be converted by each of the different components of the model, i.e. to the term $h_i(x)$.

The method then includes a step 40 for selecting a restricted number of components of the model according to the correspondence indices determined in the previous step, which restricted set is denoted by S(x).

This selection step 40 is implemented by an iterative procedure enabling a minimal set of components to be held, these components being selected as long as the cumulated sum of their correspondence indices is less than a predetermined threshold.

As a variant, this selection step comprises the selection of a fixed number of components, the correspondence indices of which are the highest.

In the embodiment described, the selection step 40 is followed by a step 42 for normalizing the correspondence indices of the selected components of the model. This normalization is achieved by the ratio of each selected index to the sum of all the selected indices.

Advantageously, the method then includes a step 43 for storing selected model components and associated normalized correspondence indices.

Such a storage step 43 is particularly useful if the analysis is performed at a deferred time with respect to the rest of the transformation 2, which means that a later conversion can be prepared efficiently.

The method then includes a step 44 for partially applying the spectral envelope transformation function by applying the sole transformation elements corresponding to the model components selected. These sole transformation elements selected are applied to the frames of the signal to be converted, in order to reduce the time required to implement this transformation.

This application step 44 corresponds to solving the following equation for the sole model components selected forming the remaining set S(x), such that:

$$F(x) = \sum_{i \in S(x)} w_i(x)[\mu_i^y + \Sigma_i^{yx}(\Sigma_i^{xx})^{-1}(x - \mu_i^x)]$$

$$\text{where } w_i(x) = \frac{h_i(x)}{\sum_{i \in S(x)} h_i(x)}$$

Thus, for a given frame, with p being the dimension of the data vectors, Q the total number of components and N the number of components selected, step 44 for partially applying the transformation function is limited to N ($P^2$+1) multiplications, which is added to the Q ($P^2$+1) modifications enabling the correspondence indices to be determined, as opposed to twice Q($P^2$+1). Consequently, the reduction in complexity obtained is at least of the order of Q/(Q+N).

Furthermore, if the result of steps 36 to 42 were stored, through the implementation of step 43, the transformation function application step 44 is limited to N($P^2$+1) operations rather than 2Q($P^2$+1), in the prior art, such that, for this step 44, the reduction in the computation time is of the order of 2Q/N.

The quality of the transformation is nevertheless preserved through the application of components exhibiting a high index of correspondence with the signal to be converted.

The method then includes a step 46 for transforming fundamental frequency features of the voice signal to be converted, using the function for transformation by scaling as determined at step 34 and realized according to conventional techniques.

Also conventionally, the conversion method then includes a step 48 for synthesizing the output signal produced, in the example described, by an HNM type synthesis which directly delivers the converted voice signal using spectral envelope information transformed at step 44 and fundamental frequency information delivered by step 46. This step 48 also uses maximum voicing frequency and phase information delivered by step 36.

The conversion method of the invention thus provides for achieving a high-quality conversion with low complexity and therefore a significant gain in computation time.

Figure 2:
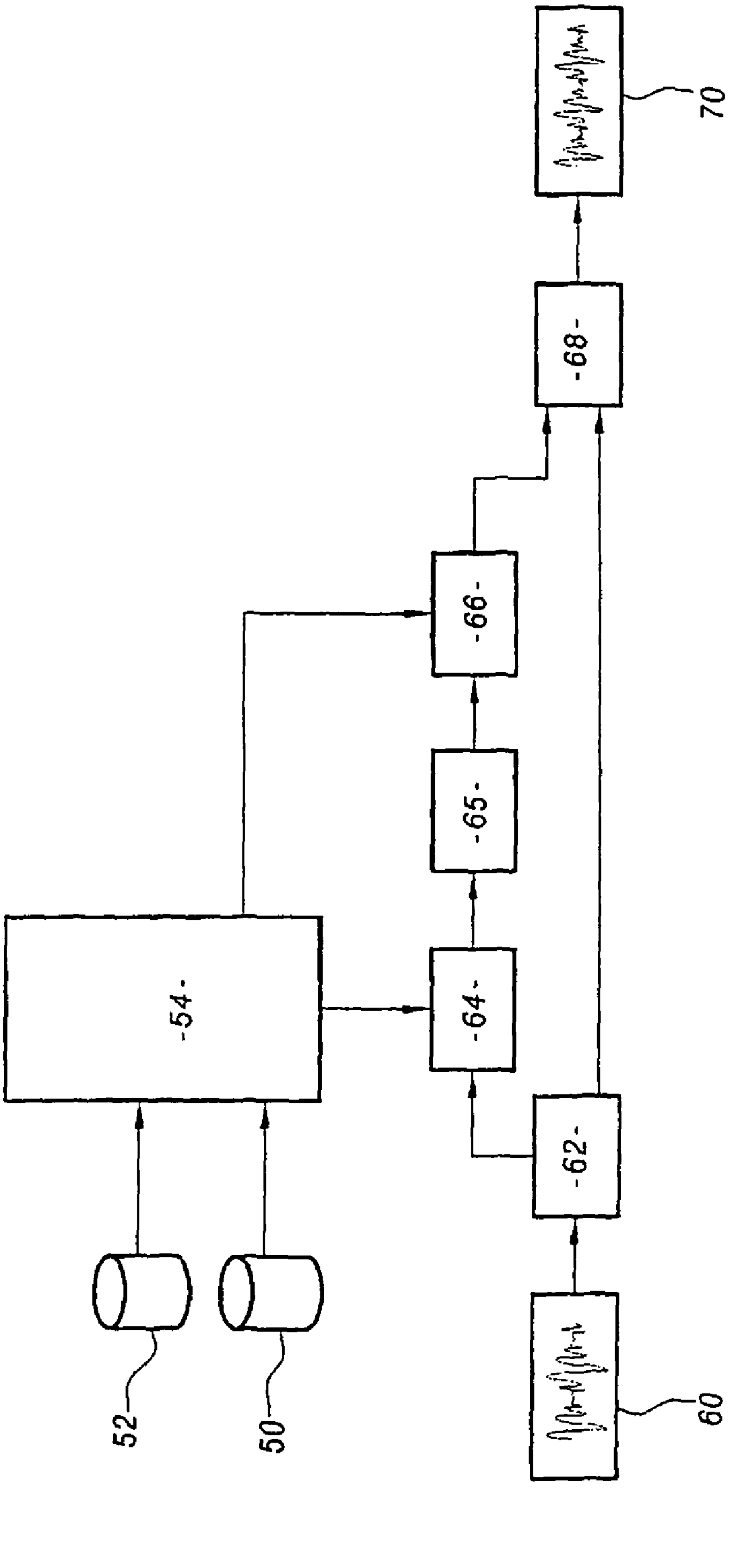
FIG. 2 represents a block diagram of a system implementing the method of the invention.

FIG. 2 shows a block diagram of a voice conversion system implementing the method described with reference to FIGS. 1A and 1B.

This system uses as input a database 50 of voice samples delivered by the source speaker and a database 52 containing at least the same voice samples delivered by the target speaker.

These two databases are used by a module 54 for determining functions for transforming acoustic features of the source speaker into acoustic features of the target speaker.

This module 54 is adapted to implement step 1 as described with reference to FIG. 1 and therefore provides for the determination of at least one function for transforming acoustic features and in particular the function for transforming spectral envelope features and the function for transforming the fundamental frequency.

In particular, the module 54 is adapted to determine the spectral envelope transformation function from a model representing in a weighted manner common acoustic features of voice samples from the target speaker and from the source speaker, on a finite set of model components.

The voice conversion system receives as input a voice signal 60 corresponding to a speech signal delivered by the source speaker and intended to be converted.

The signal 60 is introduced in an analysis module 62 implementing, for example, an HNM type decomposition enabling spectral envelope information of the signal 60 to be extracted in the form of cepstral coefficients and fundamental frequency information. The module 62 also delivers maximum voicing frequency and phase information obtained through the application of the HNM model.

The module 62 therefore implements step 36 of the method as described previously.

If necessary, the module 62 is implemented beforehand and the information is stored in order to be used later.

The system then includes a module 64 for determining indices of correspondence between the voice signal to be converted 60 and each component of the model. To this end, the module 64 receives the parameters of the model determined by the module 54.

The module 64 therefore implements step 38 of the method as described previously.

The system then comprises a module 65 for selecting components of the model implementing step 40 of the method described previously and enabling the selection of components exhibiting a correspondence index reflecting a strong connectedness with the voice signal to be converted.

Advantageously, this module 65 also performs the normalization of the correspondence indices of the selected components with respect to their mean by implementing step 42.

The system then includes a module 66 for partially applying the spectral envelope transformation function determined by the module 54, by applying sole transformation elements selected by the module 65 according to the correspondence indices.

Thus, this module 66 is adapted to implement step 44 for the partial application of the transformation function, so as to deliver as output source speaker acoustic information transformed by the sole selected elements of the transformation function, i.e. by the components of the model exhibiting a high correspondence index with the frames of the signal to be converted 60. This module therefore provides for a fast transformation of the voice signal to be converted by virtue of the partial application of the transformation function.

The quality of the transformation is preserved by the selection of components of the model exhibiting a high index of correspondence with the signal to be converted.

The module 66 is also adapted to perform a transformation of the fundamental frequency features, which is carried out conventionally by the application of the function for transformation by scaling realized according to step 46.

The system then includes a synthesis module 68 receiving as input the spectral envelope and fundamental frequency information transformed and delivered by the module 66 as well as maximum voicing frequency and phase information delivered by the analysis module 62.

The module 68 thus implements step 46 of the method described with reference to FIG. 1 and delivers a signal 70 corresponding to the voice signal 60 of the source speaker but for which the spectral envelope and fundamental frequency features have been modified in order to be similar to those of the target speaker.

The system described can be implemented in various ways and in particular with the aid of computer programs adapted and connected to hardware sound acquisition means.

This system can also be implemented on determined databases in order to form databases of converted signals ready to be used.

In particular, this system can be implemented in a first operating phase in order to deliver, for a database of signals, information relating to the selected components of the model and to their respective correspondence indices, this information then being stored.

The modules 66 and 68 of the system are implemented later upon demand to generate a voice synthesis signal using the voice signals to be converted and the information relating to the selected components and to their correspondence indices in order to obtain a maximum reduction in computation time.

Depending on the complexity of the signals and on the quality desired, the method of the invention and the corresponding system can also be implemented in real time.

As a variant, the method of the invention and the corresponding system are adapted for the determination of several transformation functions. For example, a first and a second function are determined for the transformation respectively of spectral envelope parameters and of fundamental frequency parameters for frames of a voiced nature and a third function is determined for the transformation of frames of an unvoiced nature.

In such an embodiment, provision is therefore made for a separating step, in the voice signal to be converted, for separating voiced and unvoiced frames and one or more steps for transforming each of these groups of frames.

In the context of the invention, one only, or several, of the transformation functions is applied partially so as to reduce the processing time.

Moreover, in the example described, the voice conversion is achieved by the transformation of spectral envelope features and of fundamental frequency features separately, with only the spectral envelope transformation function being applied partially. As a variant, several functions for transforming different acoustic features and/or for simultaneously transforming several acoustic features are determined and at least one of these transformation functions is applied partially.

Generally, the system is adapted to implement all the steps of the method described with reference to FIGS. 1A and 1B.

Naturally, embodiments other than those described can be envisaged.

In particular, the HNM and GMM models can be replaced by other techniques and models known to the person skilled in the art. For example, the analysis is performed using techniques known as LPC (Linear Predictive Coding), sinusoidal or MBE (Multi-Band Excited) models, the spectral parameters are parameters called LSF (Line Spectrum Frequencies), or even parameters related to the formants or to a glottic signal. As a variant, the GMM model is replaced by a fuzzy vector quantization (Fuzzy VQ).

As a variant, the estimator implemented during step 30 can be a maximum a posteriori, or MAP, criterion and corresponding to the realization of the calculation of the expectation only for the model best representing the source-target pair of vectors.

In another variant, a transformation function is determined using a technique called least squares instead of estimating the joint density described.

In this variant, the determination of a transformation function comprises the modeling of the probability density of the source vectors using a GMM model, then the determination of the parameters of the model using an EM algorithm. The modeling thus takes into account speech segments of the source speaker for which the corresponding ones delivered by the target speaker are not available.

The determination then comprises the minimization of a criterion of least squares between target and source parameters in order to obtain the transformation function. It is to be noted that the estimator of this function is still expressed in the same way but that the parameters are estimated differently and that additional data are taken into account.

The invention claimed is:

1. A method for converting a voice signal delivered by a source speaker into a converted voice signal having acoustic features resembling those of a target speaker, comprising:

- a determination of at least one transformation function for transforming acoustic features of the source speaker into acoustic features similar to those of the target speaker, using voice samples from the source and target speakers, the transformation function comprising transformation elements; and
- transformation of acoustic features of the source speaker voice signal to be converted by applying the at least one transformation function,
- wherein the transformation comprises a step for applying only selected ones of the transformation elements of the determined at least one transformation function to the signal to be converted.

2. The method according to claim 1, wherein the determination of at least one transformation function comprises a step for determining a model representing in a weighted manner common acoustic features of voice samples from the target speaker and from the source speaker on a finite set of model components, and in that the transformation comprises:

- a step for analyzing the voice signal to be converted, which voice signal being grouped into frames, in order to obtain, for each frame of samples, information relating to the acoustic features;

a step for determining an index of correspondence between the frames to be converted and each component of the model; and a step for selecting a determined part of the components of the model according to the correspondence indices, the step for applying only a determined part of at least one transformation function comprising the application to the frames to be converted of the sole part of the at least one transformation function corresponding to the selected components of the model.

3. The method according to claim 2, further comprising a step for normalizing each of the correspondence indices of the selected components with respect to the sum of all the correspondence indices of the selected components.

4. The method according to claim 3, further comprising a step for storing the correspondence indices and the determined part of the model components, performed before the transformation step, which is delayed in time.

5. The method according to claim 3, wherein the determination of the at least one transformation function comprises:

a step for analyzing voice samples from the source and target speakers, grouped into frames in order to obtain acoustic features for each frame of samples from a speaker;

a step for time alignment of the acoustic features of the source speaker with the acoustic features of the target speaker, this step being performed before the step for determining a model.

6. The method according to claim 3, wherein the step for determining a model corresponds to a determination of a Gaussian probability density mixture model.

7. The method according to claim 2, further comprising a step for storing the correspondence indices and the determined part of the model components, performed before the transformation step, which is delayed in time.

8. The method according to claim 7, wherein the determination of the at least one transformation function comprises:

a step for analyzing voice samples from the source and target speakers, grouped into frames in order to obtain acoustic features for each frame of samples from a speaker;

a step for time alignment of the acoustic features of the source speaker with the acoustic features of the target speaker, this step being performed before the step for determining a model.

9. The method according to claim 7, wherein the step for determining a model corresponds to a determination of a Gaussian probability density mixture model.

10. The method according to claim 2, wherein the determination of the at least one transformation function comprises:

a step for analyzing voice samples from the source and target speakers, grouped into frames in order to obtain acoustic features for each frame of samples from a speaker;

a step for the time alignment of the acoustic features of the source speaker with the acoustic features of the target speaker, this step being performed before the step for determining a model.

11. The method according to claim 2, wherein the step for determining a model corresponds to a determination of a Gaussian probability density mixture model.

12. The method according to claim 11, wherein the step for determining a model comprises:

a sub-step for determining a model corresponding to a Gaussian probability density mixture, and a sub-step for estimating parameters of the Gaussian probability density mixture from the estimation of the maximum likelihood between the acoustic features of the samples from the source and target speakers and the model.

13. The method according to claim 1, wherein the determination of at least one transformation function is performed based on an estimator of the realization of the acoustic features of the target speaker given the acoustic features of the source speaker.

14. The method according to claim 13, wherein the estimator is formed by the conditional expectation of the realization of the acoustic features of the target speaker given the realization of the acoustic features of the source speaker.

15. The method according to claim 1, further comprising a synthesis step for forming a converted voice signal from the transformed acoustic information.

16. A system for converting a voice signal delivered by a source speaker into a converted voice signal having acoustic features resembling those of a target speaker, comprising:

means for determining at least one transformation function for transforming acoustic features of the source speaker into acoustic features similar to those of the target speaker, using voice samples from the source and target speakers, the transformation function comprising transformation elements; and means for transforming acoustic features of the source speaker voice signal to be converted by applying the at least one transformation function, wherein the transformation means are adapted for the application only of selected ones of the transformation elements of the determined at least one transformation function to the signal to be converted.

17. The system according to claim 16, wherein the determination means are adapted for the determination of at least one transformation function using a model representing in a weighted manner common acoustic features of voice samples from the source and target speakers on a finite set of components, and in that it includes:

means for analyzing the signal to be converted, which signal being grouped into frames, in order to obtain, for each frame of samples, information relating to the acoustic features;

means for determining an index of correspondence between the frames to be converted and each component of the model; and means for selecting a determined part of the components of the model according to the correspondence indices, the application means being adapted for applying only a determined part of the at least one transformation function corresponding to the selected components of the model.

* * * * *